(12) United States Patent
Teranishi

(10) Patent No.: US 7,218,276 B2
(45) Date of Patent: May 15, 2007

(54) POSITIONAL INFORMATION DETERMINING APPARATUS

(75) Inventor: Koichiro Teranishi, Chiba (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 10/858,152

(22) Filed: Jun. 1, 2004

(65) Prior Publication Data

US 2005/0017898 A1    Jan. 27, 2005

(30) Foreign Application Priority Data

Jun. 3, 2003    (JP) .............................. 2003-158543

(51) Int. Cl.
*G01S 5/14* (2006.01)
(52) U.S. Cl. .................................. 342/357.1
(58) Field of Classification Search ........... 342/357.09, 342/357.1
See application file for complete search history.

(56) References Cited

U.S. PATENT DOCUMENTS 5,550,551 A *   8/1996   Alesio ......................... 342/457
5,576,716 A *  11/1996   Sadler ...................... 342/357.07
5,751,245 A     5/1998   Janky et al.
6,147,644 A *  11/2000   Castles et al. .............. 342/367
6,321,091 B1   11/2001   Holland
6,515,619 B1    2/2003   McKay, Jr.
2002/0067306 A1* 6/2002  Ishigaki et al. ......... 342/357.06

OTHER PUBLICATIONS

Patent Abstracts of Japan vol. 2002, No. 09, Sep. 4, 2002 & JP 2002 156438 A (Matsushita Electric Ind Co. Ltd), May 31, 2002.

* cited by examiner

*Primary Examiner*—Gregory C. Issing
(74) *Attorney, Agent, or Firm*—Finnegan, Henderson, Farabow, Garrett & Dunner L.L.P.

(57) ABSTRACT

A positional information determining apparatus capable of reducing power consumption markedly in simple structure in radio transmission of positioning results to a navigation device. Satellite waves S1 to S4 are received from a plurality of GPS satellites 2 to 5 and analyzed at prescribed time intervals, thus obtaining positional data D5 denoting own current position. Only when positional data D5 can be determined, the positional data D5 is transmitted by radio to the navigation device that uses the positional data D5. Thus it is made possible to reduce power consumption with certainty because radio transmission is made only when positional data D5 can be obtained.

4 Claims, 4 Drawing Sheets

POSITIONAL INFORMATION DETERMINING APPARATUS

BACKGROUND OF THE INVENTION

1. Field of the Invention

The present invention relates to a positional information determining apparatus, and is preferably applied to a global positioning system (GPS) navigation system that receives satellite waves coming from a plurality of GPS satellites, for example.

2. Description of the Related Art

Global Positioning System (GPS) navigation systems are each comprised of a GPS receiver and a navigation device in combination. A GPS navigation system is designed such that a navigation device display on a map the current position of the GPS navigation system itself detected by a GPS receiver.

In practice, the GPS receiver is designed to obtain positional information by analyzing satellite waves received from a plurality of GPS satellites (for example, four pieces) via GPS antennas, calculate the current position of the GPS navigation system based on the positional information, and output the positional data denoting the current position to the navigation device.

The navigation device is designed to display a map showing the surroundings of the current position on a monitor such as a liquid crystal display based on the positional data denoting the current position as well as an icon in a given shape indicating the current position, thereby visually indicating the current position of a user on the map.

Some GPS receivers are wirelessly connected to navigation devices so as to output positional data denoting current positions to the navigation devices. (e.g. refer to Page 2 and FIG. 10 in Japanese Patent Application Laid-Open No. 2002-156438)

Because such GPS receivers as configured above are wirelessly connected to navigation devices, they require an enormous amount of transmit power to emit radio waves by constantly putting radio communication means into operation, compared to those constructed in a wired connection, causing an increase in overall power consumption.

In particular, detachable mobile GPS navigation systems have a problem that operating time is shortened in mobile use when the GPS receivers consume a considerably large amount of power.

SUMMARY OF THE INVENTION

In view of the foregoing, an object of this invention is to provide a positional information determining apparatus in simple configuration that is capable of reducing power consumption markedly.

The foregoing object and other objects of the invention have been achieved by the provision of the invention under claims 1, 3 and 4 in which the own positional information is determined by analyzing satellite waves received from a plurality of satellites at prescribed time intervals, and in radio transmission of positional information to an appointed device that uses it, the radio transmission is made only when the positional information can be determined.

Therefore, when no positional information is determined, no radio transmission is made for positional information, which means that positional information is transmitted by radio to the appointed device only when the positional information can be obtained, thereby ensuring a decrease in power consumption.

Further, according to the invention of claim 2, positional information is transmitted by radio to the appointed device only when the positional information can be determined and is different from the preceding positional information.

Therefore, it is possible to transmit by radio positional information only when it can be determined, and at the same time to reduce unnecessary power consumption by avoiding transmitting positional information of the same contents to the appointed device repeatedly.

Further, according to the invention under claims 5, 7 and 8, the own positional information is determined by analyzing satellite waves received from a plurality of satellites at prescribed time intervals, and in radio transmission of positional information to an appointed device that uses it, time intervals for the radio transmission of the positional information to the appointed device are adjusted according to the accuracy of the positional information determined based on a Dilution Of Precision (DOP) value only when the positional information can be determined.

Therefore, the radio transmission is made only when positional information can be determined, and when the accuracy of the positional information is identified excellent based on the DOP value, the time intervals for the radio transmission of the positional information can be made shorter, and when identified poor, the time intervals can be made longer, which consequently makes it possible to provide effective and high-precision positional information with a necessary minimum of power consumption.

Further, according to the invention under claim 6, the radio transmission is made only when positional information can be determined and is different from the preceding positional information, and when the accuracy of the positional information is identified excellent based on the DOP value, the time intervals for the radio transmission are made shorter, and when identified poor, the time intervals are made longer.

Therefore, it is possible to adjust the time intervals for transmitting by radio the positional information, according to the accuracy of the positional information identified on the basis of the DOP value, and besides to reduce unnecessary power consumption without transmitting the positional information of the same contents repeatedly.

The nature, principle and utility of the invention will be more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Circuit Configuration of GPS Receiver

Figure 1:
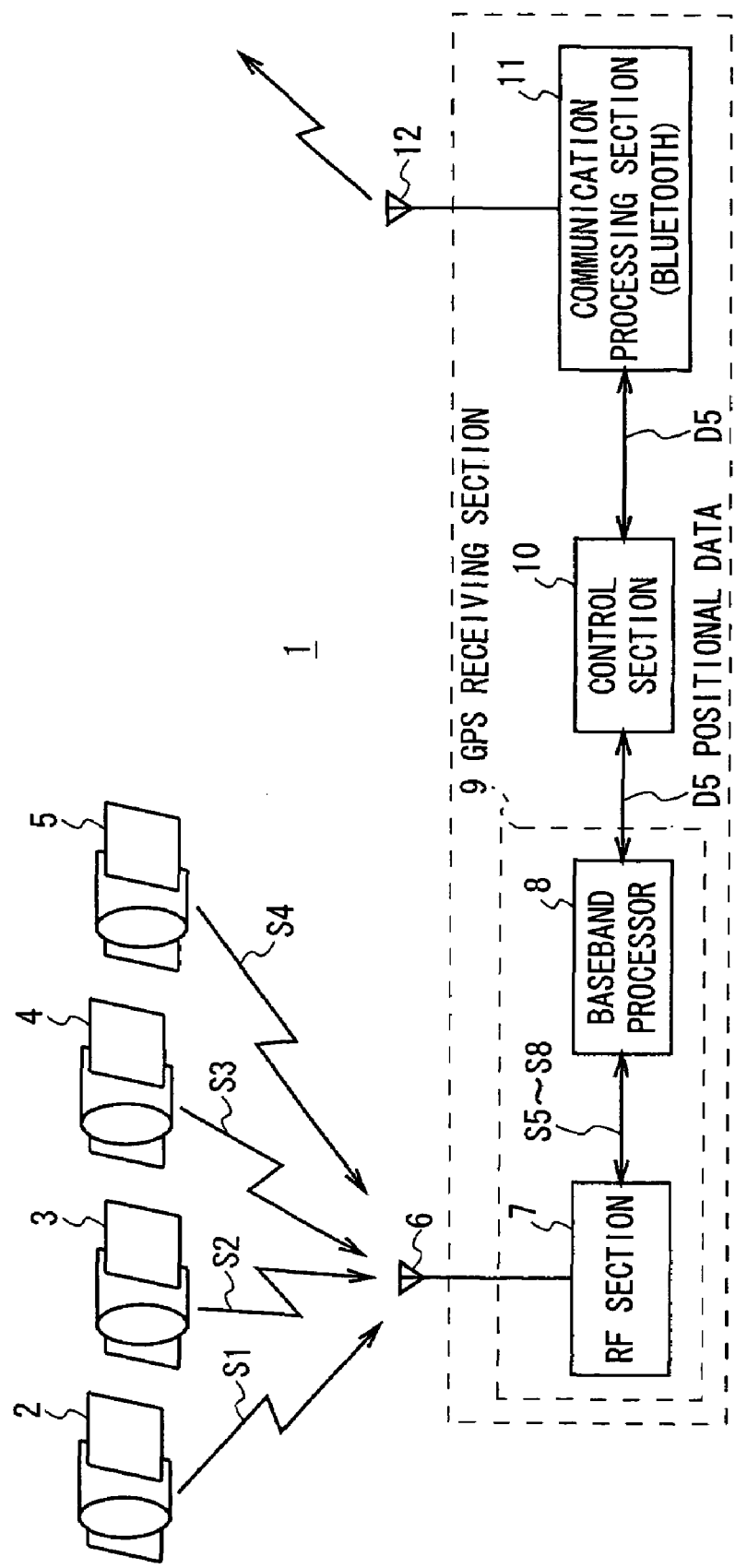
FIG. 1 is a schematic block diagram showing the circuit structure of a GPS receiver in this invention.

As shown in FIG. 1. a Global Positioning System (GPS) receiver 1 as a positional information determining apparatus receives, through a GPS antenna 6 and the Radio Frequency (RF) section 7 of a GPS receiving section 9, satellite waves S1 to S4 in the 1.5 GHz band transmitted from a plurality of GPS satellites 2 to 5 residing within the receivable range of waves, and the satellite waves S1 to S4 are converted by the RF section 7 down to the 1 MHz band on which a baseband processor 8 can process them with ease and then sent as reception signals S5 to S8 to the baseband processor 8.

The baseband processor 8 obtains the positions of the GPS satellites 2 to 5 as well as the travel times of the satellite waves S1 to S4 from the GPS satellite 2 to 5 to the GPS receiver 1 by performing prescribed demodulation and other processes on the reception signals S5 to S8, thus determining the current position of the GPS receiver 1 using the obtained data.

Then, the baseband processor 8 lets an internal memory (not shown in figure) store positional data D5 denoting the current position (longitude, latitude, and altitude, etc.) of the GPS receiver 1, which is also sent to a control section 10 comprising a Central Processing Unit (CPU).

It should be noted that the baseband processor 8 is designed to obtain the positional data D5 denoting the current position of the GPS receiver 1 once a second with the positional data D5 updated every time, thus sending the up-to-date positional data D5 to the control section 10.

The control section 10 is designed to feed power to the GPS receiving section 9 and a communication processing section 11 and to control communication of the communication processing section 11, and to transmit by radio the positional data D5 to a navigation device (not shown in figure) located in a short distance via the communication processing section 11 comprising a Bluetooth module and an antenna 12.

Next, explanation is given on two ways of communication control procedures (an "intermittent communication control procedure" and an "intermittent communication control procedure according to positioning precision") available when the control section 10 of the GPS receiver 1 transmits by radio positional data D5 to the navigation device through the communication processing section 11.

(2) Communication Control Procedures

(2-1) Intermittent Communication Control Procedure

Figure 2:
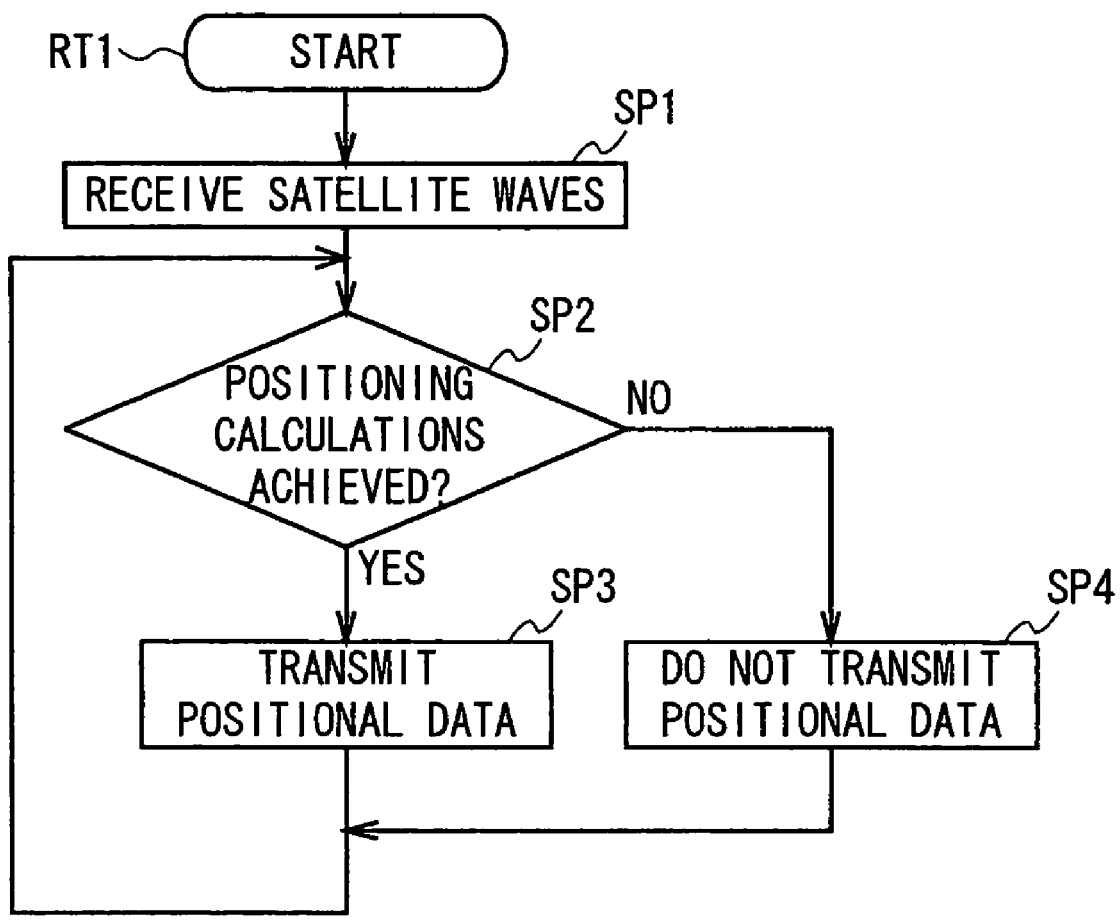
FIG. 2 is a flowchart showing an intermittent communication control procedure.

As shown in FIG. 2, the control section 10 of the GPS receiver 1 enters a routine RT1 at the start step and moves on to step SP1. In step SP1 the control section 10 receives satellite waves S1 to S4 with the GPS antenna 6 and the GPS receiving section 9, then the processing proceeds to the next step SP2.

In step SP2 the control section 10 determines whether the baseband processor 8 of the GPS receiving section 9 has calculated the current position. The current position cannot be calculated when the satellite waves S1 to S4 do not arrive from the four GPS satellites 2 to 5 and therefore the baseband processor 8 fails to receive parameters (reception signals S1 to S5) required for the positioning calculations.

When an affirmative result is obtained in this step SP2, it means that the control unit 10 has confirmed from the positional data D5 received from the baseband processor 8 of the GPS receiving section 9 that the current position has been successfully calculated. Then the processing of the control section 10 moves to the next step SP3.

Having received the positional data D5 successfully from the baseband processor 8, in step SP3 the control section 10 transmits by radio the positional data D5 to the navigation device through the communication processing section 11, and the processing returns to step SP2.

On the other hand, a negative result, if obtained in step SP2, means that the control unit 10 has not received the positional data D5 from the baseband processor 8 of the GPS receiving section 9, that is, the positioning calculations has not been done. In this case, the processing of the control section 10 moves to the next step SP4.

Since the control section 10 failed to receive positional data D5 from the baseband processor 8, the control section 10 does not make the radio transmission to the navigation device through the communication processing section 11 in step 4 and the processing returns to step SP2.

In this manner, the control section 10 is designed to be capable of transmitting by radio positional data D5 to the navigation device through the communication processing section 11 only when the current position can be obtained by positioning calculations once a second without fail, otherwise no radio transmission is made, thereby it is made possible to transmit by radio a necessary minimum amount of effective information to the navigation device with a significantly less amount of power consumption, compared to the case of constantly transmitting by radio positional data D5 every second.

Figure 3:
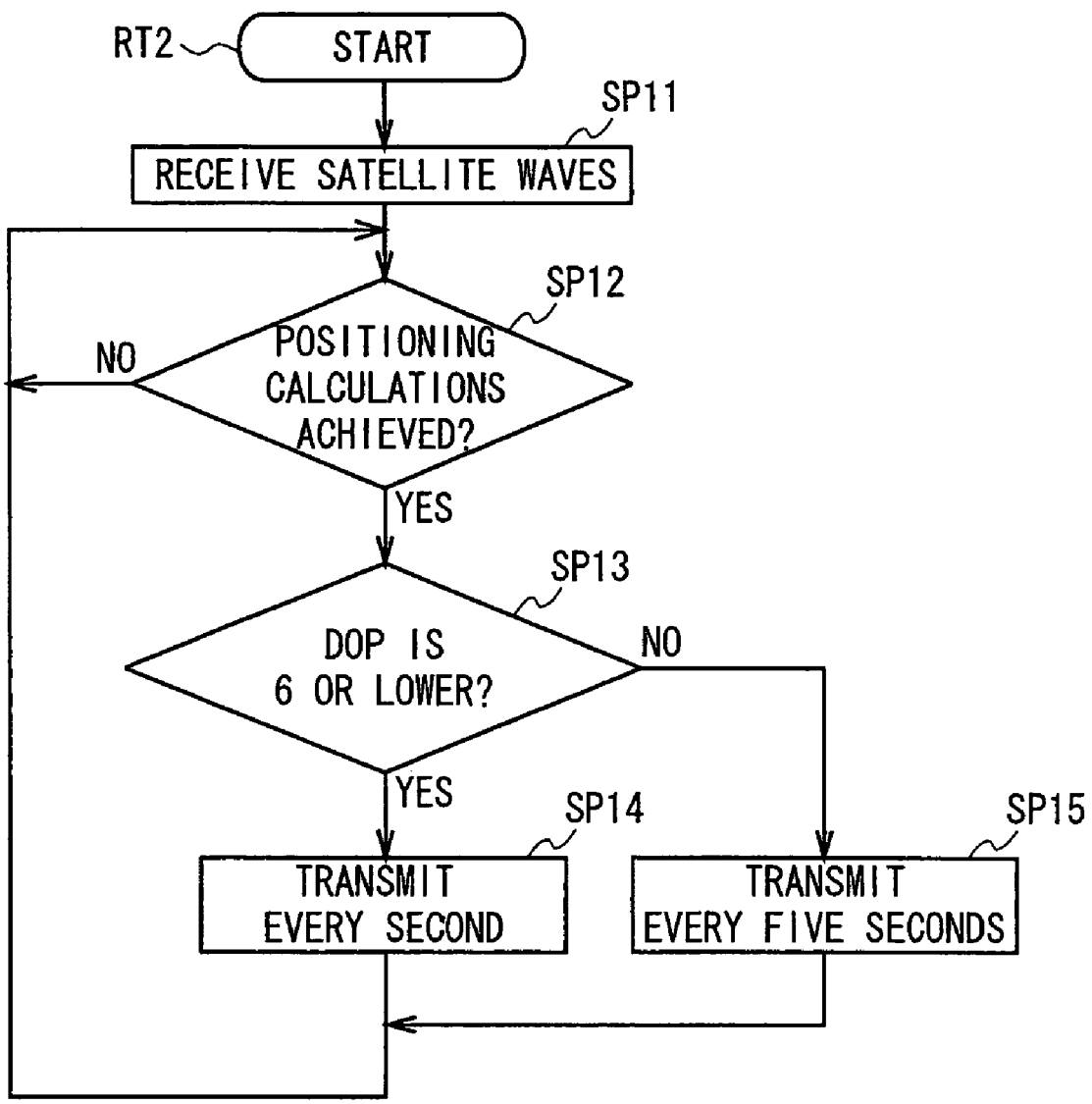
FIG. 3 is a flowchart showing an intermittent communication control procedure according to positioning precision.

(2-2) Intermittent Communication Control Procedure According to Positioning Precision As shown in FIG. 3, the control section 10 of the GPS receiver 1 enters a routine RT2 at the start step, and moves to step SP11. In step SP11 the control section 10 receives satellite waves S1 to S4 with the GPS antenna 6 and the GPS receiving section 9, and the processing goes on to the next step SP12.

In step SP12 the control section 10 determines whether the baseband processor 8 of the GPS receiving section 9 has calculated the current position with the positioning calculations. A negative result, when obtained in this step, means that the control unit 10 has not received positional data D5 from the baseband processor 8 of the GPS receiving section 9 and cannot confirm the current position. In this case, the control section 10 stands by until it receives positional data D5 from the baseband processor 8.

On the other hand, an affirmative result, when obtained in step SP12, means that the control unit 10 has received positional data D5 from the baseband processor 8 of the GPS receiving section 9 and has confirmed that the current position had been calculated. In this case, the processing of the control section 10 proceeds to step SP13.

In step SP13 the control section 10 determines whether or not the positional data D5 supplied from the baseband processor 8 is "6" or less in terms of a Dilution Of Precision (DOP) value.

The DOP value is a numerical value being the index of "deterioration in precision" of the GPS positioning calculations and greatly influenced by the configuration of the GPS satellites 2 to 5. To be concrete, GPS positioning calculations are made using at least three GPS satellites (in this embodiment, four GPS satellites 2 to 5 are used as an example), and the DOP value is determined based on the configuration of at least three GPS satellites 2 to 5 used for the positioning calculations.

For example, let us consider a unit sphere with the observation point as its center and the GPS satellites be transposed in a way to meet the direction from which actual GPS satellites can be observed on the spherical surface, and imagine a tetrahedron produced by connecting the four GPS satellites with one another. The larger the volume of the tetrahedron is, the smaller the DOP value gets, which indicates that the GPS positioning precision at this time is good, and on the other hand the smaller the volume is, the larger the DOP value gets, which indicates that the GPS positioning precision at that time is not good.

That is, what the volume is large is that the GPS satellites 2 to 5 being used for the positioning calculations are in a dispersed state in the sky, and in this state the best precision is obtained with the DOP value getting smaller.

On the other hand, what the volume is small is that the GPS satellites 2 to 5 being used for the positioning calculations are not dispersed in the sky but clustered in any one direction, and in this state the precision deteriorates with the DOP value getting larger.

Figure 4:
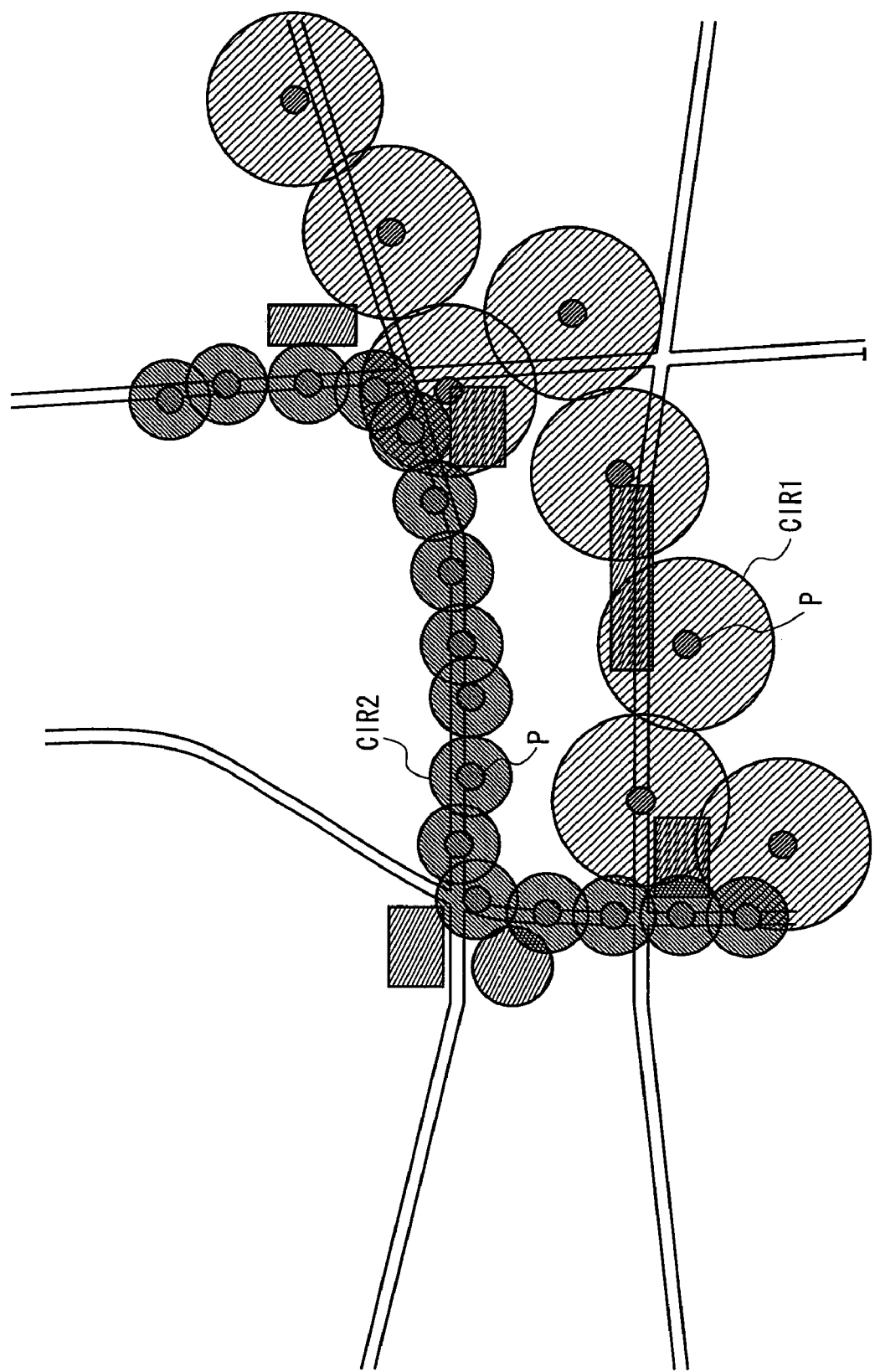
FIG. 4 is a schematic diagram used for explaining different positioning precisions and their communication intervals.

In actuality, as shown in FIG. 4, the navigation device is designed to indicate the current position, which moves with time, on a map with an icon P in a given shape and a circle CIR1, CIR2 according to the positional data D5 received from the GPS receiver 1.

The circle CIR1, CIR2 with the icon P as the center is the index by which the icon P indicates the accuracy of the current position: the larger the diameter of the circle CIR1 the lower the positioning precision; and the smaller the diameter of the circle CIR2 the higher the positioning precision.

That is, with the navigation device, when the DOP value is "6" or less, the icon P pointing the current position is displayed at the center of a small circle CIR2, and when the DOP value is over "6", the icon P pointing the current position is displayed at the center of a large circle CIR1.

Accordingly, with the navigation device the icon P is displayed either in a large circle CIR1 or a small circle CIR2 responding to variations in the DOP value of positional data D5.

An affirmative result in step SP13, when obtained, means that the accuracy of the positional data D5 indicating the current position is high with the DOP value of "6" or less, and then the processing of the control section 10 moves to the next step SP14.

In step SP14, as the positioning precision is high with the DOP value of "6" or less, the control section 10 transmits by radio the positional data D5 to the navigation device every second, and the processing returns to the above step SP12.

On the other hand, a negative result in step SP13, when obtained, means that the accuracy of the positional data D5 is low with the DOP value larger than "6", and then the processing of the control section 10 moves to the next step SP15.

In step SP15, as the positioning precision is low with DOP value larger than "6", the control section 10 transmits by radio the positional data D5 to the navigation device every five seconds, and the processing returns to the above step SP12.

In this manner, the control section 10 determines the accuracy of positional data D5 with the DOP value as the criterion, and transmits by radio the positional data D5 to the navigation device every second, the rate of actual positioning calculations, when the positioning precision is determined high, thereby it is designed such that the current position can be updated with a circle CIR2 and the icon P at short time intervals (once a second) with an excellent level of positioning precision.

Also, the control section 10 determines the accuracy of positional data D5 with the DOP value as the criterion, and transmits by radio positional data D5 to the navigation device every five seconds, not once a second, when the positioning precision is determined low, thereby it is designed to reduce power consumption avoiding uselessly transmitting positional data D5 of a low level of positioning precision and poor reliability to the navigation device at short time intervals.

(3) Operation and Effects

In the above structure, the control section 10 of the GPS receiver 1 transmits by radio positional data D5 to the navigation device through the communication processing section 11 only when positioning calculations are achieved with the baseband processor 8 of the GPS receiving section 9, and when positioning calculations cannot be done, no radio transmission will be made at all because there exists no positional data D5 to be transmitted or because positional data D5 to be transmitted to the control section 10 is not effective, thus making it possible to transmit by radio positional data D5 effectively with a necessary minimum of power consumption.

Also, the control section 10 will make radio transmission once a second when positioning calculations are achieved by the baseband processor 8 of the GPS receiving section 9 and when the accuracy of positional data D5 is determined high on the basis of the DOP value. When the accuracy of positional data D5 is determined low, however, the radio transmission is made once every five seconds only in an expanded time interval, thereby it is made possible to transmit by radio positional data D5 effectively with a necessary minimum of power consumption according to the accuracy of positional data D5.

In this case, in the navigation device, when the accuracy of positional data D5 is high, a CIR2 and an icon P are displayed on the map of the display, and updated every second. When the accuracy of positional data D5 is low, on the other hand, a CIR1 and an icon P are displayed on the map of the display, and updated once every five seconds.

Accordingly, with the navigation device it is possible to let the user recognize the positioning precision visually by way of the size of a circle CIR1 or CIR2 being displayed on the display of the navigation device and at the same time to let the user intuitively recognize the accuracy of the current position pointed by an icon P being displayed, by way of time intervals at which the icon P is updated.

According to the above structure, because the control section 10 of the GPS receiver 1 can control the radio transmission of positional data D5 by the communication processing section 11 responding to detected results of positional data D5, it is possible to markedly reduce power consumption, compared with the conventional case of constantly transmitting by radio positional data D5 through the communication processing section 11.

(4) Other Embodiments

In the embodiment described above, positional data D5 is transmitted by radio to the navigation device through the communication processing section 11 only when positioning calculations are achieved every second without fail following the intermittent communication control procedure RT1, otherwise, no transmission is made. The present invention, however, is not limited to it and can be designed as well such that no transmission is made even when the positioning calculations are achieved every second without fail unless the preceding positional data D5 and the current positional data D5 have different contents, for the current position does not change, which may conclude that it is not worthy to transmit by radio the current positional data D5. In this case, the control section 10 can avoid transmitting the same positional data D5 repeatedly, thus further reducing power consumption.

Also, in the embodiment described above, the positioning precision is determined high when the DOP value of positional data D5 as positional information is "6" or less, or where the positioning precision is determined low when the DOP value is larger than "6". The present invention, however, is not limited to it and the accuracy of positional data D5 can be determined on the basis of a variety of other DOP values.

Further, in the embodiment described above, two kinds of time intervals, namely once a second and once every five seconds are to be set for transmitting by radio positional data D5 to the navigation device through the communication processing section 11 according to the DOP value. The present invention, however, is not limited to it and any given time intervals in a plurality of kinds can be set.

Furthermore, in the embodiment described above, the GPS receiver 1 as a positional information determining apparatus is composed of the GPS receiving section 9 as a positional information determining means, the communication processing section 11 comprising a Bluetooth module as a communication means, and the control section 10 as a control means. The present invention, however, is not limited to it, and the positional information determining apparatus can be composed of a positional information determining means, a communication means, and a control means constructed in a variety of other structure. For example, a communication means pursuant to wireless Local Area Network (LAN) specifications such as IEEE802.11a, b, g system, can be used as the communication means.

As described above, according to the invention under claims 1, 3, and 4, power consumption can be reduced with certainty because, when positional information can not be determined, no radio transmission is made for positional information, and the radio transmission is made to an appointed device only when positional information can be determined.

Also, according to claim 2, positional information is transmitted by radio only when the positional information can be determined, and it is possible to reduce unnecessary power consumption with which to repeatedly transmit positional information of the same contents to an appointed device.

Further, according to the invention under claims 5, 7, and 8, only when positional information can be determined, the positional information is transmitted by radio, and when the accuracy of the positional information is determined excellent on the basis of the DOP value, time intervals are made shorter for the radio transmission of the positional information, and when the accuracy of positional information is determined poor on the basis of the DOP value, the time intervals are made longer for the radio transmission of the positional information, thus making it possible to provide effective and high-precision positional information with a necessary minimum power consumption.

Still further, according to claim 6, time intervals can be adjusted in radio transmission of positional information according to the accuracy of the positional information determined on the basis of the DOP value, and besides it is possible to reduce unnecessary power consumption with which to transmit positional information of the same contents repeatedly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A positional information determining apparatus comprising:
    positional information determining means for determining own positional information by analyzing satellite waves received from a plurality of satellites at prescribed time intervals;
    communication means for transmitting by radio said positional information determined by said positional information determining means to an appointed device that uses the positional information; and
    control means for controlling time intervals for radio transmission of said positional information to said appointed device through said communication means, according to accuracy of the positional information determined on the basis of a Dilution Of Precision (DOP) value, only when the positional information can be determined by said positional information determining means.

2. The positional information determining apparatus according to claim 1, wherein:
    said control means transmits by radio said positional information to said appointed device through said communication means only when the positional information has any change.

3. A positional information transmission control method comprising:
    a positional information determining step of determining own positional information by analyzing satellite waves received from a plurality of satellites at prescribed time intervals;
    a communication step of transmitting by radio said positional information determined in said positional information determining step by means of prescribed communication means to an appointed device that uses the positional information; and
    control step of controlling time intervals for radio transmission of said positional information to said appointed device through said communication means, according to accuracy of the positional information determined on the basis of a Dilution Of Precision (DOP) value, only when the positional information can be determined in said positional information determining step.

4. A positional information transmission control program causing a positional information determining apparatus to execute:
    a positional information determining step of determining own positional information by analyzing satellite waves received from a plurality of satellites at prescribed time intervals;
    a communication step of transmitting by radio said positional information determined in said positional information determining step by means of prescribed communication means to an appointed device that uses the positional information; and
    control step of controlling time intervals for radio transmission of said positional information to said appointed devices through said communication means, according to accuracy of the positional information determined based on a Dilution Of Precision (DOP) value, only when said positional information can be determined in said positional information determining step.

* * * * *